(12) United States Patent
Acre

(10) Patent No.: US 7,753,105 B2
(45) Date of Patent: Jul. 13, 2010

(54) LIQUID COOLED CONDENSER HAVING AN INTEGRATED HEAT EXCHANGER

(75) Inventor: James A Acre, Barker, NY (US)

(73) Assignee: Delphi Technologies, Inc., Troy, MI (US)

( * ) Notice: Subject to any disclaimer, the term of this patent is extended or adjusted under 35 U.S.C. 154(b) by 1093 days.

(21) Appl. No.: 11/434,652

(22) Filed: May 16, 2006

(65) Prior Publication Data
US 2007/0267169 A1 Nov. 22, 2007

(51) Int. Cl.
*B60H 1/00* (2006.01)

(52) U.S. Cl. .............................. 165/43; 165/41; 165/51; 165/140

(58) Field of Classification Search ................. 165/41, 165/42, 43, 44, 51, 140, 153, 167, 170; 62/244; 123/41.1
See application file for complete search history.

(56) References Cited

U.S. PATENT DOCUMENTS

| | | | |
|---|---|---|---|
| 3,096,818 A * | 7/1963 | Evans et al. ................. | 165/140 |
| 4,227,570 A * | 10/1980 | Crews ......................... | 165/140 |
| 4,535,729 A | 8/1985 | Faylor | |
| 5,009,262 A * | 4/1991 | Halstead et al. ............. | 165/140 |
| 5,265,437 A | 11/1993 | Saperstein et al. | |
| 5,369,883 A | 12/1994 | So et al. | |
| 5,408,843 A | 4/1995 | Lukas et al. | |
| 5,526,873 A | 6/1996 | Marsais et al. | |
| 5,538,077 A | 7/1996 | So et al. | |
| 5,931,224 A | 8/1999 | Chevallier | |
| 6,029,345 A * | 2/2000 | Christensen ................. | 165/140 |
| 6,092,383 A | 7/2000 | Mertens | |
| 6,216,775 B1 | 4/2001 | Hedman | |
| 6,340,054 B1 | 1/2002 | Schwarz et al. | |
| 6,408,940 B1 | 6/2002 | Naji et al. | |
| 6,595,271 B2 | 7/2003 | Komoda | |
| 6,607,026 B1 | 8/2003 | Naji et al. | |
| 7,328,739 B2 * | 2/2008 | Watanabe et al. ............. | 165/41 |
| 2002/0066552 A1 | 6/2002 | Komoda | |
| 2005/0155749 A1 | 7/2005 | Memory et al. | |
| 2005/0194123 A1 | 9/2005 | Strahle et al. | |
| 2005/0205236 A1 | 9/2005 | Kalbacher et al. | |
| 2008/0105403 A1 * | 5/2008 | Kamen et al. ................ | 165/140 |

FOREIGN PATENT DOCUMENTS

| | | |
|---|---|---|
| EP | 0 678 661 | 12/1994 |
| EP | 0 930 477 | 7/1999 |
| FR | 2 610 989 | 8/1988 |

OTHER PUBLICATIONS

English language Abstract for FR 2 610 989 extracted from espacenet.com database dated Apr. 4, 2006.

* cited by examiner

*Primary Examiner*—Ljiljana (Lil) V Ciric
(74) *Attorney, Agent, or Firm*—Patrick M. Griffin

(57) ABSTRACT

A thermal management system for a vehicle comprises a radiator and a liquid cooled condenser in fluid communication with the radiator. The liquid coolant circulates through the radiator and the condenser. The refrigerant for an HVAC unit also circulates through the condenser, with the condenser transferring heat from the refrigerant to the liquid coolant. The heat exchanger is disposed within the condenser and is in fluid communication with an engine for circulating an engine oil therebetween. The heat exchanger transfers heat from the engine oil to the liquid coolant within the condenser.

28 Claims, 6 Drawing Sheets

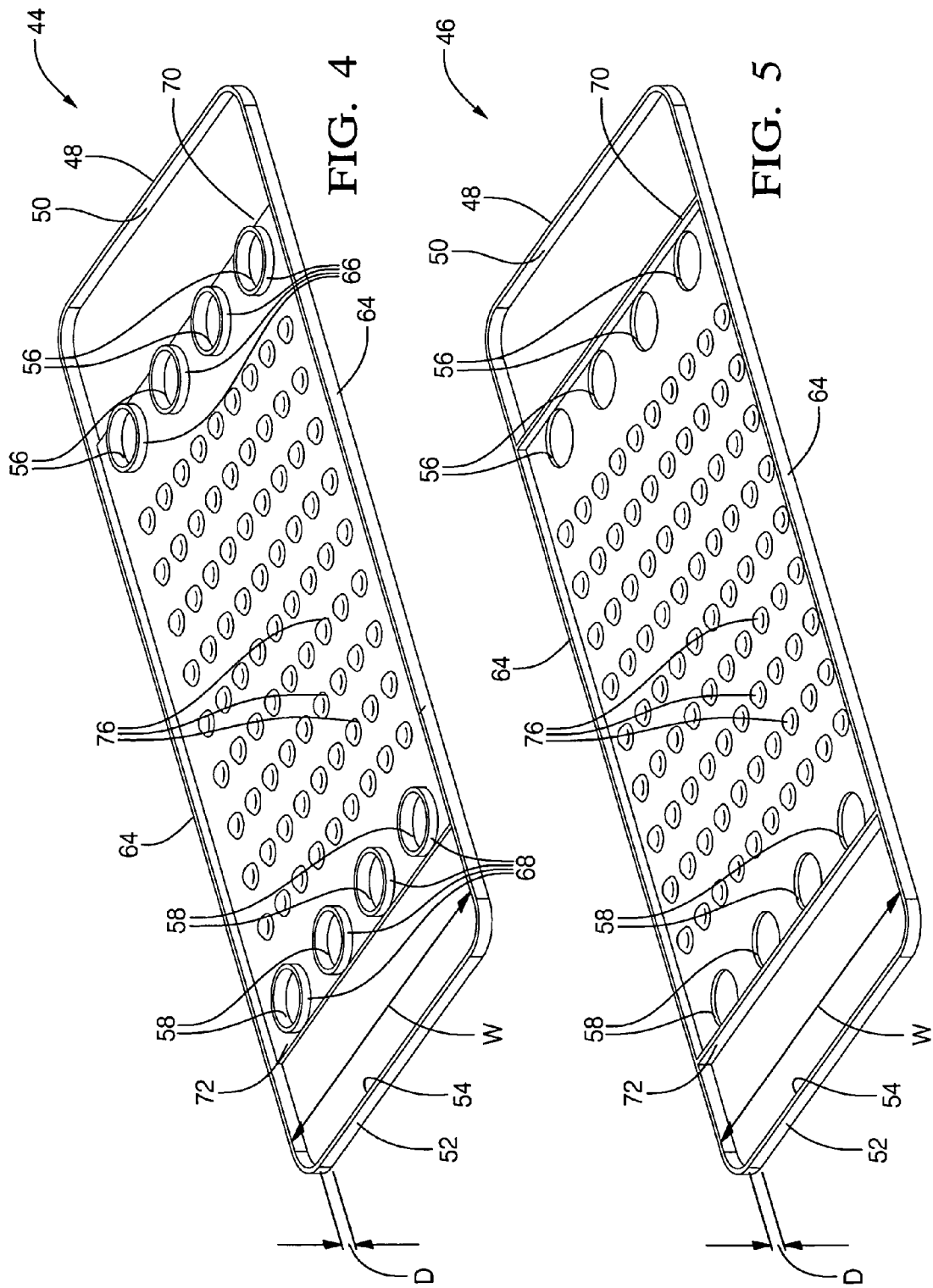

LIQUID COOLED CONDENSER HAVING AN INTEGRATED HEAT EXCHANGER

BACKGROUND OF THE INVENTION

1. Field of the Invention

The subject invention generally relates to a thermal management system for a vehicle, and more specifically to a condenser utilized in the thermal management system.

2. Description of the Related Art

Vehicles utilize a thermal management system for controlling cabin temperatures within the vehicle and for controlling fluid temperatures related to the operation of the vehicle. The thermal management system includes a Heating Ventilating Air Conditioning (HVAC) unit for controlling the cabin temperature of the vehicle. The HVAC unit includes a radiator for removing heat from a liquid coolant (antifreeze), and further includes a typical automotive air conditioning system having a condenser, an expansion valve, an evaporator, and a compressor. The air conditioning system circulates a refrigerant therethrough for removing heat from a cabin of the vehicle as is well known in the art. An engine includes a pump in fluid communication with the radiator for circulating the liquid coolant through the radiator. In the past, it has been common for the condenser of the HVAC system to include a standard air-cooled heat exchanger, mounted in an engine compartment near the front of the vehicle to pass a flow of air through the air cooled condenser. This type of air-cooled condenser removes heat from the refrigerant by passing the refrigerant through a plurality of fins as the flow of air is directed through the condenser and over the fins. The heat stored in the refrigerant is transferred to the fins and then to the flow of air, thereby removing heat from the refrigerant. This type of air-cooled condenser requires an extensive system of refrigerant lines and fittings to transport the refrigerant throughout the engine compartment.

Recently, some vehicles have begun utilizing a liquid cooled condenser in the HVAC unit, instead of the standard air-cooled condenser. The liquid cooled condenser is in fluid communication with the radiator and circulates the liquid coolant through the condenser to transfer the heat from the refrigerant to the liquid coolant. The liquid coolant is then circulated back to the radiator, where the radiator transfers the heat stored in the liquid coolant to the flow of air.

U.S. Pat. No. 6,340,054 discloses an example of a liquid cooled heat exchanger. The liquid cooled heat exchanger circulates the liquid coolant through the heat exchanger to transfer heat from an oil to the liquid coolant. The condenser comprises a plurality of plates. The plurality of plates include a plurality of first plates and a plurality of second plates. The first plates and the second plates are stacked adjacent each other in an alternating relationship. The plurality of plates define a coolant inlet for receiving the liquid coolant, a coolant outlet for discharging the liquid coolant, at least one oil inlet for receiving the oil, and at least one oil outlet for discharging the oil. The plurality of plates cooperates to define an oil path in fluid communication with the oil inlet and the oil outlet passage for circulating the oil therethrough. The plurality of plates also cooperates to define a coolant path separate from the oil path. The coolant path is in fluid communication with the coolant inlet and the coolant outlet for circulating the liquid coolant therethrough. The liquid cooled heat exchanger may be positioned anywhere in the vehicle, and does not need to be located near the front of the vehicle.

It is often desirable to cool certain fluids necessary for the efficient operation of the vehicle. These fluids may include an engine oil, a transmission oil, a power steering fluid, or some other similar fluid. It is known to circulate the fluid through a heat exchanger disposed within the radiator and cool the fluid by passing air over the radiator. Such a heat exchanger is disclosed in U.S. Pat. No. 5,369,883. The heat exchanger of the '883 patent includes a plurality of plates, each defining a channel within the plate and stacked in spaced relationship. The heat exchanger is disposed within a header of the radiator, with the liquid coolant circulating through the radiator between the plurality of plates, thereby absorbing heat from the fluid circulating through the heat exchanger. Similar to the standard air cooled condenser, an extensive system of fluid lines and fittings are required to direct the fluid to the radiator near the front of the vehicle.

SUMMARY OF THE INVENTION AND ADVANTAGES

The subject invention provides a thermal management system for a vehicle. The thermal management system comprises a Heating Ventilating Air Conditioning (HVAC) unit, which includes a radiator for removing heat from a liquid coolant and further includes a condenser circulating a refrigerant therethrough. The condenser is in fluid communication with the radiator, and circulates the liquid coolant through the condenser to remove heat from the refrigerant. The system further comprises an engine. The engine includes a pump in fluid communication with the radiator. The pump circulates the liquid coolant through the radiator. The condenser comprises a plurality of plates including a plurality of first plates, and further including a plurality of second plates stacked adjacent the plurality of first plates in alternating relationship relative to the plurality of first plates. The plurality of plates each include a first end defining an inlet chamber and a second end defining an outlet chamber. The inlet chamber receives the liquid coolant, and the outlet chamber discharges the liquid coolant. The plurality of plates each define at least one inlet passage disposed adjacent the inlet chamber, near the first end of the plurality of plates, and receives the refrigerant. Each of the plurality of plates further define at least one outlet passage disposed adjacent the outlet chamber, near the second end of the plurality of plates, and discharges the refrigerant. The plurality of plates cooperate together to define a refrigerant path in fluid communication with the at least one inlet passage and the at least on outlet passage. The refrigerant path circulates the refrigerant therethrough. The plurality of plates also cooperate together to further define a coolant path, separate from the refrigerant path, and in fluid communication with the inlet chamber and the outlet chamber. The refrigerant path circulates the liquid coolant therethrough. A heat exchanger is disposed within the outlet chamber of the condenser, and is in fluid communication with the engine for circulating an engine oil from the engine through the heat exchanger to transfer heat from the engine oil to the liquid coolant.

Accordingly, the subject invention provides a liquid cooled condenser for an HVAC unit circulating a refrigerant therethrough, and including a heat exchanger disposed therein in fluid communication with an engine circulating an engine oil therethrough for transferring heat from the refrigerant and an engine oil to a liquid coolant. The condenser of the subject invention may be selectively located within the vehicle to minimize the overall length of fluid lines and the total number of fittings required to convey the refrigerant and the engine oil through the engine compartment, thereby lowering production costs of the vehicle and minimizing the risk of releasing any of the refrigerant into the atmosphere. Additionally, by removing the oil cooler from the radiator tank, the subject invention permits the radiator to be constructed from aluminum.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a perspective view of one of a plurality of first plates;

FIG. 5 is a perspective view of one of a plurality of second plates;

DETAILED DESCRIPTION OF THE INVENTION

Figure 1:
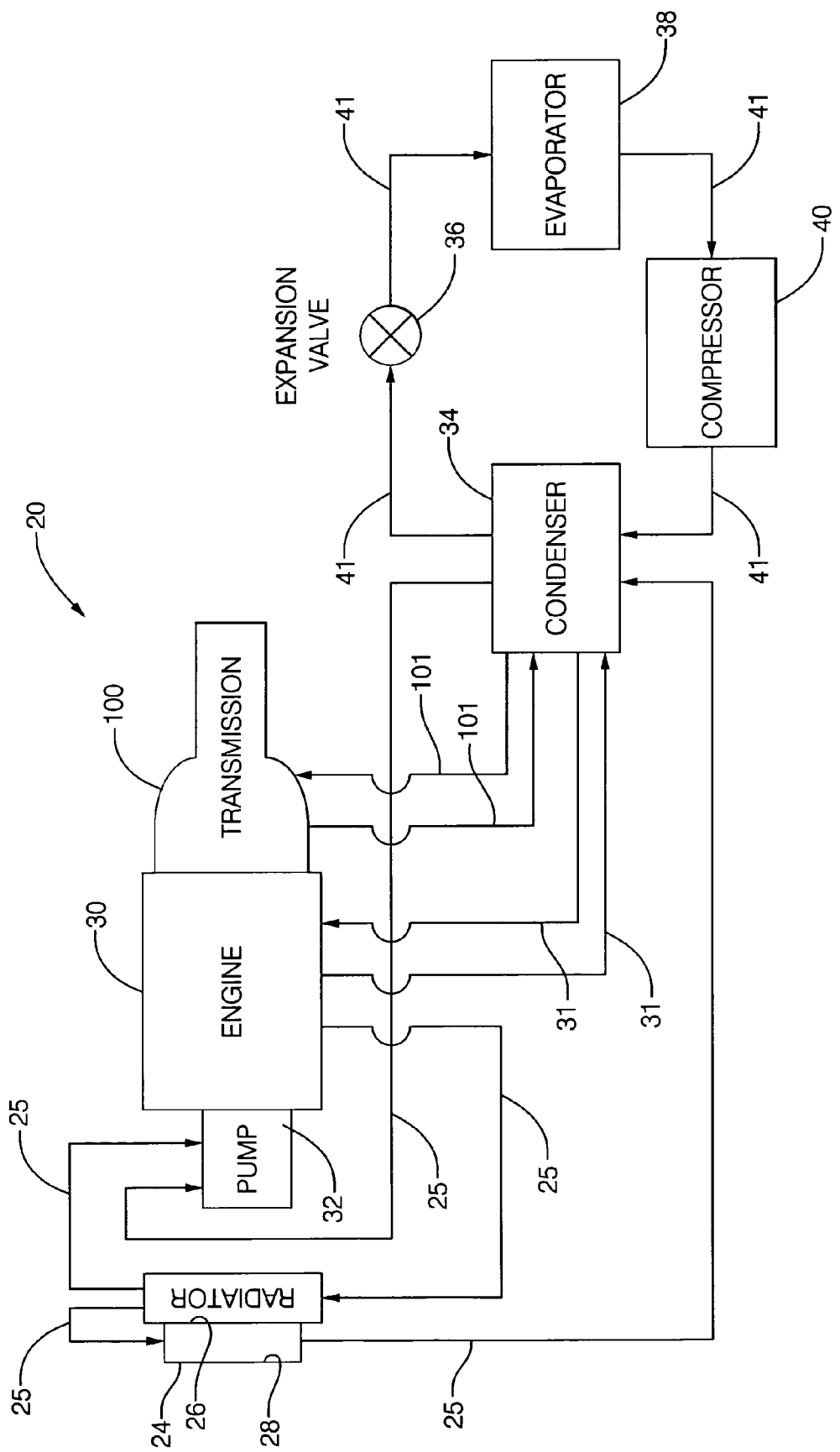
FIG. 1 is a schematic view of a thermal management system.
Figure 2:
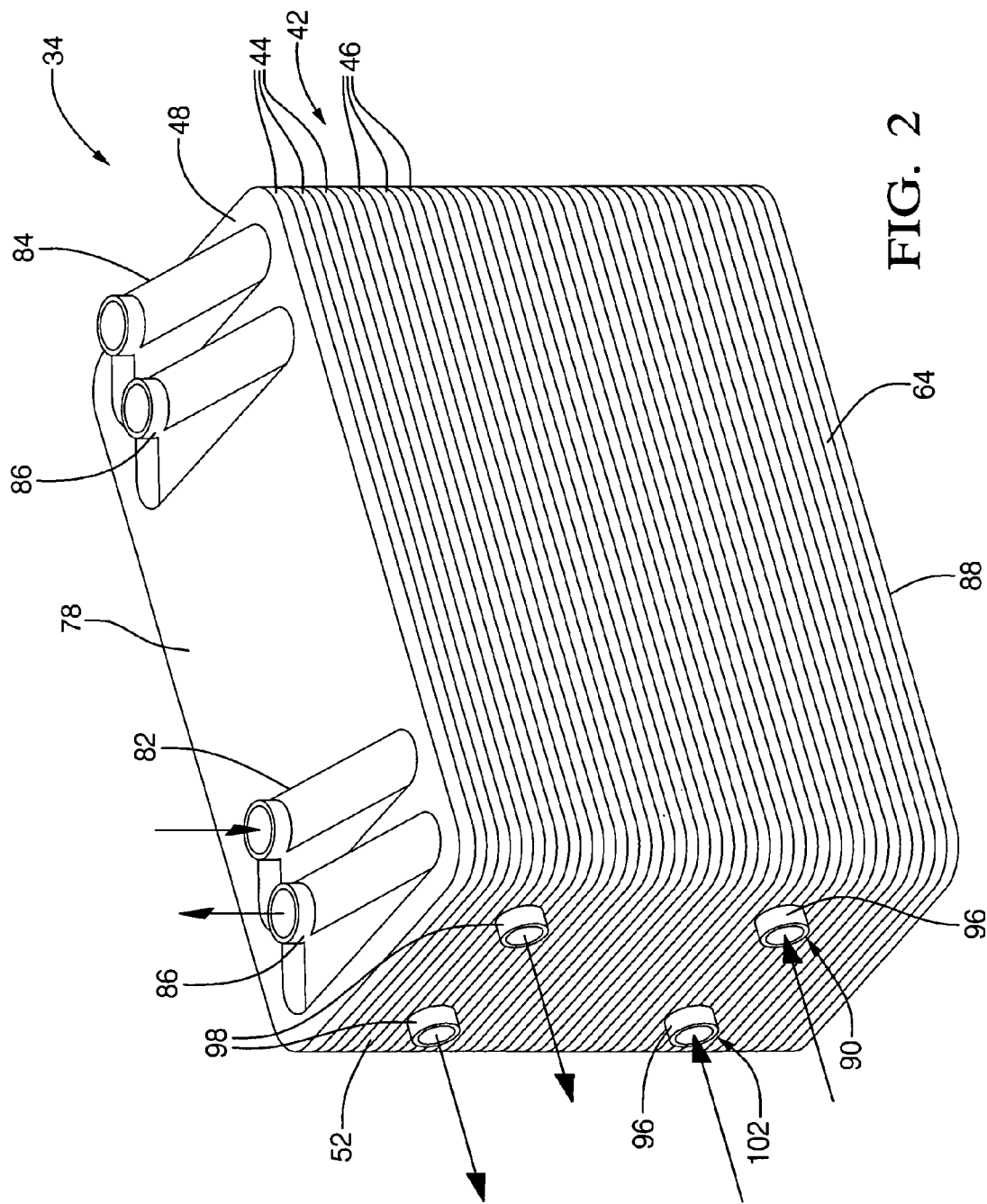
FIG. 2 is a perspective view of a condenser.
Figure 3:
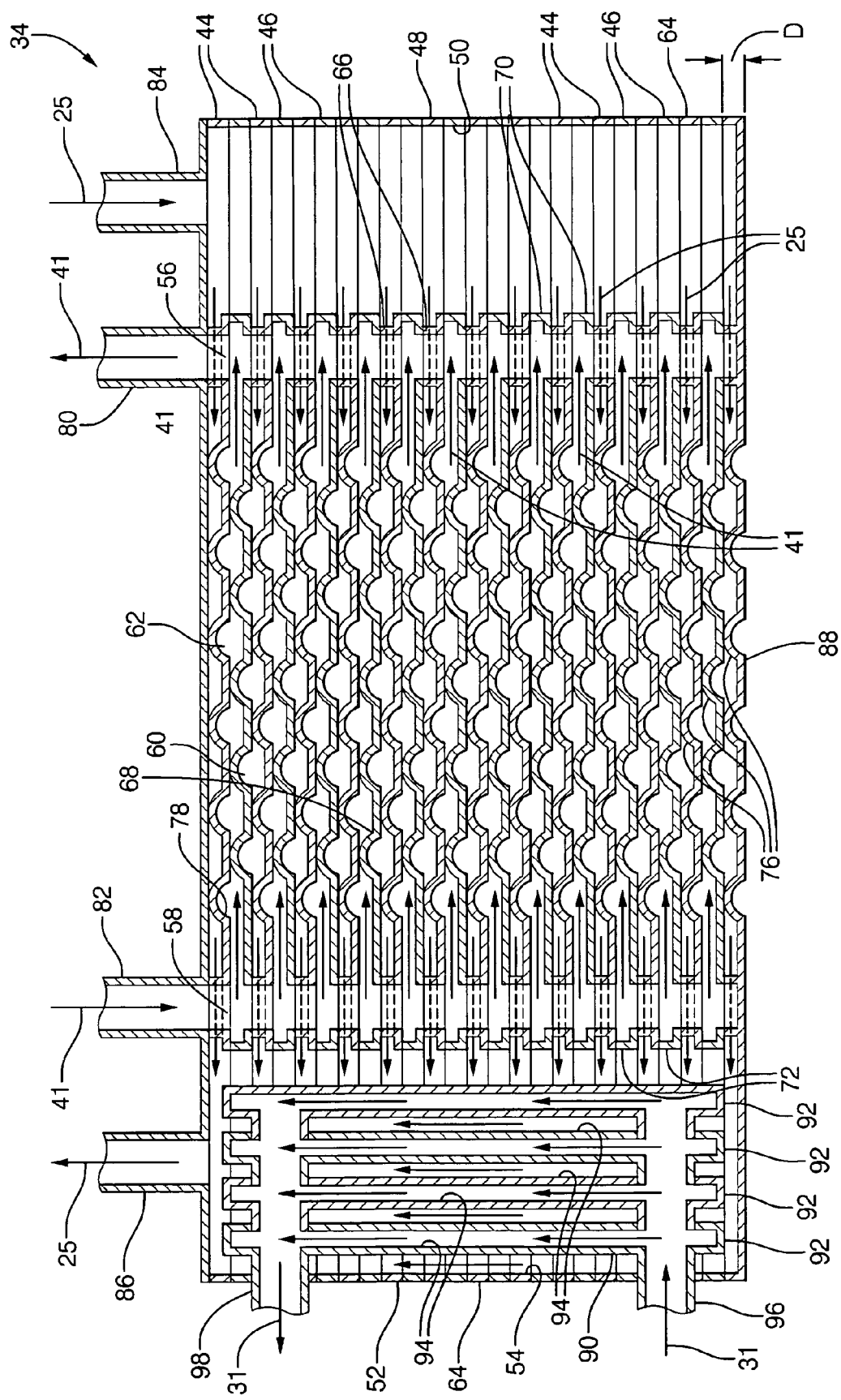
FIG. 3 is a cross-sectional side view of the condenser showing a heat exchanger disposed in an outlet chamber of the condenser.
Figure 6:
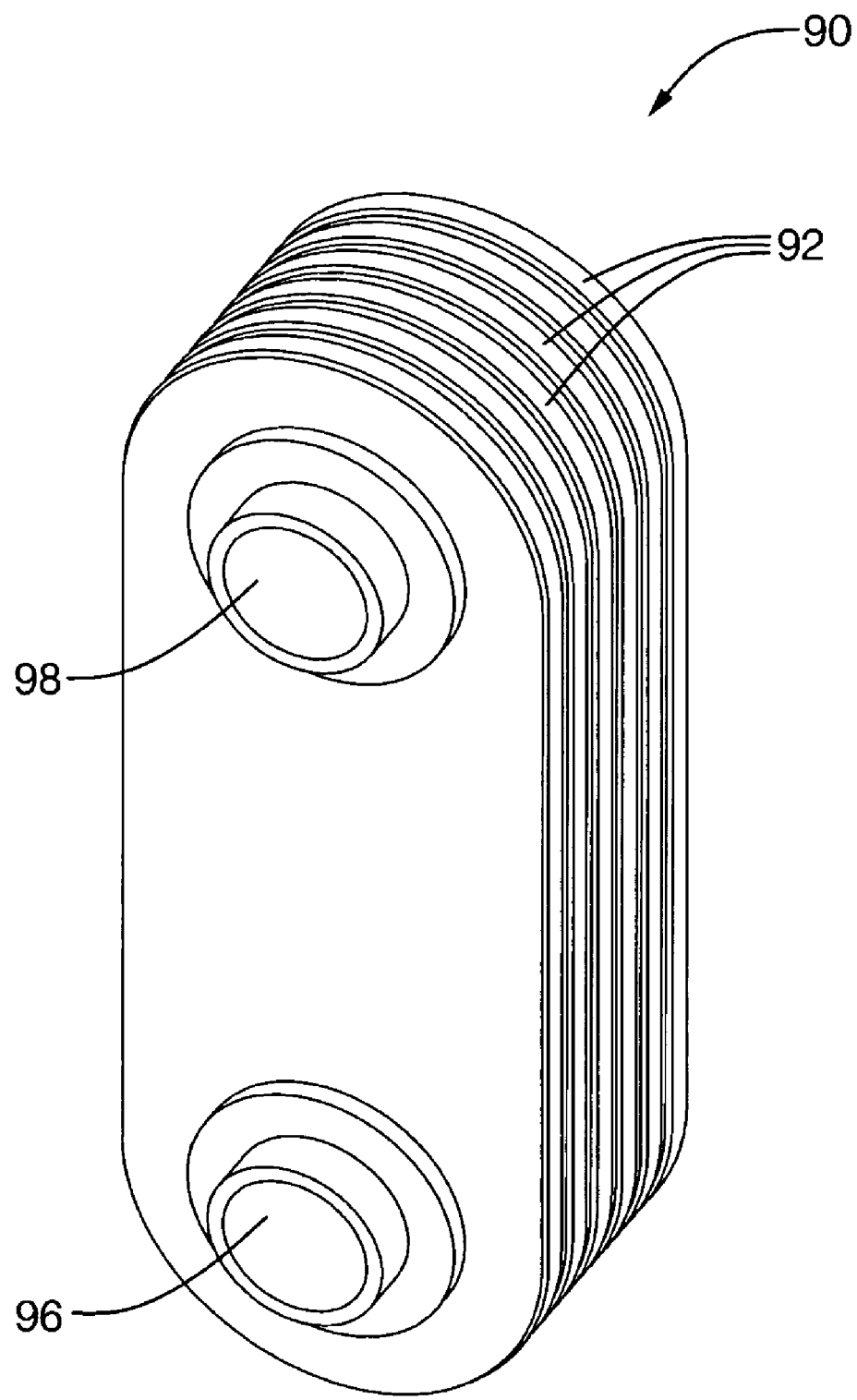
FIG. 6 is a perspective view of the heat exchanger.

Referring to the Figures, wherein like numerals indicate corresponding parts throughout the several views, a thermal management system is shown generally at 20.

The thermal management system 20 is incorporated into a vehicle, and comprises a Heating Ventilating Air Conditioning (HVAC) unit 22. The HVAC unit 22 includes a radiator 24 for removing heat from a liquid coolant 25. The liquid coolant 25 is typically a glycol based antifreeze, but may also be water or some other liquid suitable for use in the radiator 24 of the vehicle. To accommodate the additional heat added to the liquid coolant 25 by the subject invention, as described below, the radiator 24 includes a low temperature radiator 24. The low temperature radiator 24 is preferably constructed from aluminum and may include a primary cooling passageway 26 and a secondary cooling passageway 28. The primary cooling passageway 26 removes a first quantity of heat from the liquid coolant 25, and the secondary cooling passageway 28 removes a second quantity of heat in addition to the first quantity of heat removed by the primary cooling passageway 26. It should be understood that the low temperature radiator 24 may be otherwise configured to meet any specific design requirements of the system 20. The system 20 further comprises an engine 30 including an engine oil 31 circulating through the engine 30 and further includes a pump 32. The pump 32 is in fluid communication with the radiator 24, and circulates the liquid coolant 25 through the radiator 24.

The HVAC unit 22 further includes a standard automotive air conditioning system having a condenser 34, an expansion valve 36, an evaporator 38, and a compressor 40, all in fluid communication with each other and circulating a refrigerant 41 therethrough. The refrigerant 41 is typically R-134a as is well known in the art for use in the standard automotive air conditioning system. However, it should be understood that the refrigerant 41 could be some other suitable material. The condenser 34 is in fluid communication with the radiator 24 and circulates the liquid coolant 25 through the condenser 34 to remove heat from the refrigerant 41. The condenser 34 comprises a plurality of plates 42. The plurality of plates 42 include a plurality of first plates 44 and a plurality of second plates 46 stacked adjacent the plurality of first plates 44 in alternating relationship relative to the plurality of first plates 44. The plurality of plates 42 each includes a first end 48, which defines an inlet chamber 50. The inlet chamber 50 receives the liquid coolant 25. The plurality of plates 42 further includes a second end 52, which defines an outlet chamber 54. The outlet chamber 54 discharges the liquid coolant 25.

Each of the plurality of plates 42 define at least one inlet passage 56 disposed adjacent the inlet chamber 50, near the first end 48 of the plurality of plates 42. The inlet passage 56 receives the refrigerant 41 from the compressor 40. Each of the plurality of plates 42 further define at least one outlet passage 58 disposed adjacent the outlet chamber 54, and near the second end 52 of the plurality of plates 42. The outlet passage 58 discharges the refrigerant 41 to the expansion valve 36. The inlet passage 56 may include a plurality of inlet passages 56, and the outlet passage 58 may include a plurality of outlet passages 58. As shown in the figures, the plurality of inlet passages 56 is equal to four inlet passages 56, and the plurality of outlet passages 58 is equal to four outlet passages 58.

The plurality of plates 42 cooperate together to define a refrigerant path 60 in fluid communication with the inlet passage 56 and the outlet passage 58. The refrigerant path 60 circulates the refrigerant 41 therethrough to transfer heat stored in the refrigerant 41 to the plurality of plates 42. The plurality of plates 42 further define a coolant path 62, separate from the refrigerant path 60, and in fluid communication with the inlet chamber 50 and the outlet chamber 54. The coolant path 62 circulates the liquid coolant 25 therethrough to absorb heat stored in the plurality of plates 42 and transport the heat to the radiator 24, where the heat is then transferred to the flow of air.

The alternating plurality of first plates 44 and second plates 46 are disposed in alternating relationship to orient the refrigerant path 60 and the coolant path 62 in stacked alternating relationship. In other words, a region defined above one of the first plates 44 and below one of the second plates 46 defines the coolant path 62, and a region defined above one of the second plates 46 and below one of the first plates 44 defines the refrigerant path 60.

Each of the plurality of plates 42 includes an outer wall 64. The outer wall 64 extends upward a pre-determined distance D from each of the plurality of plates 42. The outer wall 64 of each of the plurality of plates 42 is in sealing engagement with the outer wall 64 of any other of the plurality of plates 42 abutting the outer wall 64 of each of the plurality of plates 42.

Each of the plurality of first plates 44 includes a first ring 66 disposed circumferentially around the inlet passage 56, and a second ring 68 disposed circumferentially around the outlet passage 58. The first ring 66 and the second ring 68 extend upward the pre-determined distance D from the plurality of first plates 44, and abut in sealing engagement one of the plurality of second plates 46 disposed directly above each of the plurality of first plates 44.

The plurality of second plates 46 include a first wall 70 and a second wall 72 extending across a width W of the plurality of second plates 46. The first wall 70 and the second wall 72 extend upward the pre-determined distance D from the plurality of second plates 46, and abut in sealing engagement one of the plurality of first plates 44 disposed directly above each of the plurality of second plates 46. The first wall 70 is disposed between the inlet chamber 50 and the inlet passage 56, and the second wall 72 is disposed between the outlet chamber 54 and the outlet passage 58.

Each of the plurality of plates 42 includes a plurality of flow disrupting devices 76 extending upward from the plurality of plates 42. The flow disrupting devices 76 create turbulence in the liquid coolant 25 and the refrigerant 41 to increase a heat transfer coefficient between the liquid coolant 25 and the plurality of plates 42, and between the refrigerant 41 and the plurality of plates 42. The plurality of flow disrupting devices 76 extend upward the pre-determined distance D from the plurality of plates 42, and abut in sealing engagement one of the plurality of plates 42 disposed directly above each of the plurality of plates 42.

The condenser 34 further comprises a top cover 78, which is disposed above the plurality of plates 42. The top cover 78 is in sealing engagement with the outer wall 64 of one of the plurality of plates 42 disposed below and abutting the top cover 78. The top cover 78 includes a refrigerant inflow port 80 in fluid communication with the inlet passage 56, and a refrigerant outflow port 82 in fluid communication with the outlet passage 58. The top cover 78 further includes a coolant inflow port 84 in fluid communication with the inlet chamber 50, and a coolant outflow port 86 in fluid communication with the outlet chamber 54. A bottom cover 88 is disposed below the plurality of plates 42, and is in sealing engagement with the outer wall 64 of one of the plurality of plates 42 disposed above and abutting the bottom cover 88. The top cover 78 and the bottom cover 88 sandwich the plurality of plates 42 therebetween with the inlet chamber 50 and the outlet chamber 54 extending between the top cover 78 and the bottom cover 88.

Accordingly, the refrigerant 41 enters the condenser 34 through the refrigerant inflow port 80, flowing through the inlet passage 56 of the plurality of plates 42. As the refrigerant 41 flows through the inlet passage 56, the refrigerant 41 spills out onto the plurality of second plates 46, with the first wall 70 preventing fluid communication with the inlet chamber 50. The refrigerant 41 will then flow through the refrigerant path 60, which is bounded by one of the second plates 46 below, and one of the first plates 44 above, until reaching the outlet passage 58. The refrigerant 41 flows through the outlet passage 58 and out the refrigerant outflow port 82, where the refrigerant 41 is directed to the expansion valve 36, with the second wall 72 preventing fluid communication with the outlet chamber 54. The liquid coolant 25 enters the condenser 34 through the coolant inflow port 84, into the inlet chamber 50. The liquid coolant 25 flows through the coolant path 62, with the first wall 70 and the first ring 66 preventing fluid communication with the refrigerant path 60. The liquid coolant 25 flows through the coolant path 62 bounded by one of the first plates 44 below, and one of the second plates 46 above, until reaching the outlet chamber 54. The liquid coolant 25 then flows through the outlet chamber 54 and exits the condenser 34 by the coolant outflow port 86.

A heat exchanger 90 is disposed within the outlet chamber 54 of the condenser 34, and is in fluid communication with the engine 30. It should be understood that the heat exchanger (90) is often referred to in the art as an oil cooler, and may be utilized for cooling several different types of fluids used in automotive vehicles. The engine oil 31 circulates from the engine 30 through the heat exchanger 90 and back to the engine 30 to transfer heat from the engine oil 31 to the liquid coolant 25 as the engine oil 31 passes through the heat exchanger 90.

The heat exchanger 90 includes a plurality of cooler plates 92, each defining a channel 94 therethrough. The plurality of cooler plates 92 are stacked in spaced relationship to permit the liquid coolant 25 to circulate between the plurality of cooler plates 92 in the outlet chamber 54.

The heat exchanger 90 further includes an intake 96 and an outtake 98, both in fluid communication with the engine 30. The intake 96 is in fluid communication with the channels 94 of the cooler plates 92 for directing the engine oil 31 from the engine 30 into the channels 94. The outtake 98 is in fluid communication with the channels 94 of the cooler plates 92 for discharging the oil from the channels 94 of the cooler plates 92 and directing the engine oil 31 back to the engine 30.

Figure 7:
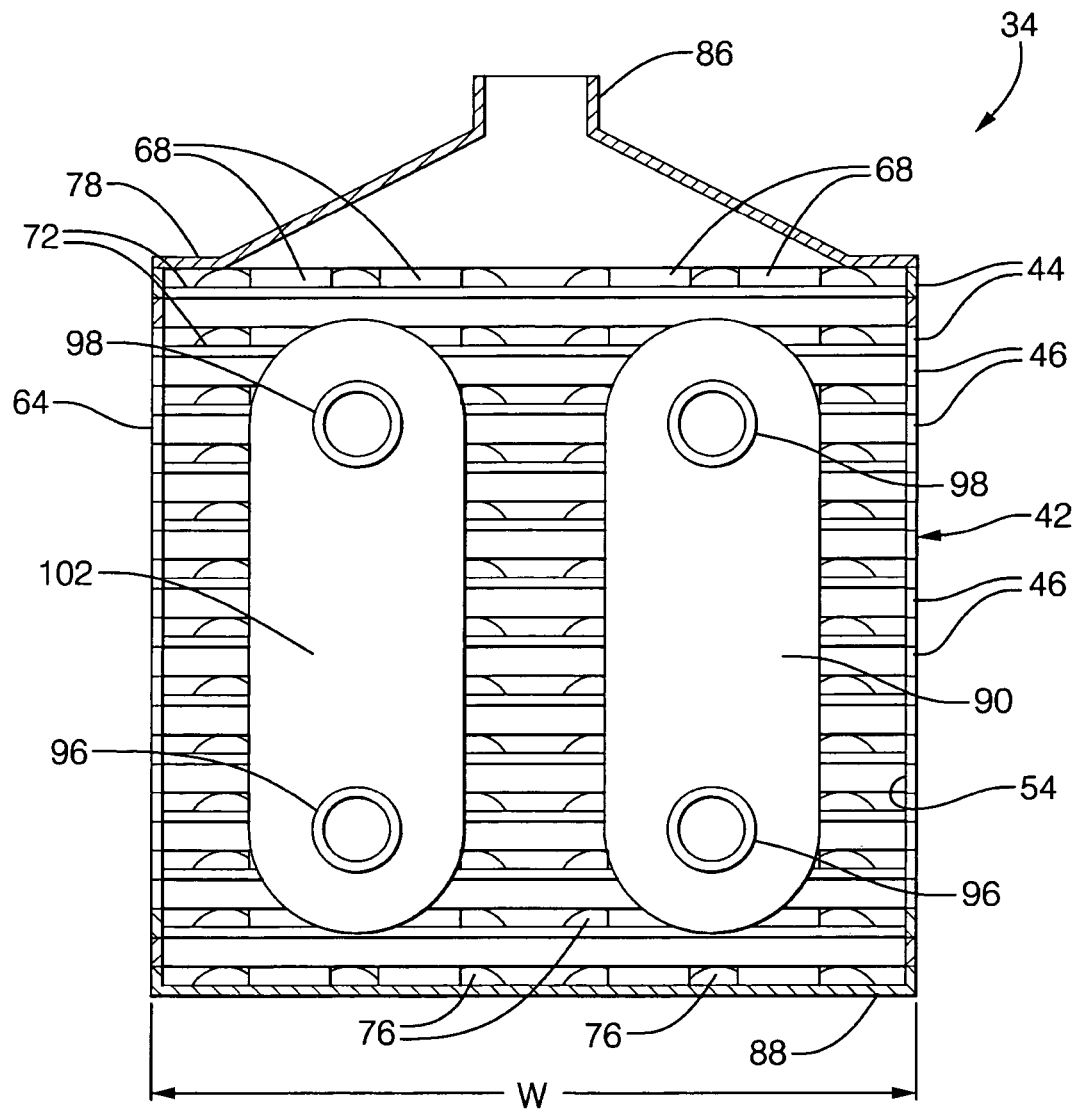
FIG. 7 is a cross sectional end view of the condenser showing a second heat exchanger disposed in the outlet chamber of the condenser.

The system 20 may further comprise a transmission 100 coupled to the engine 30. The transmission 100 includes a transmission fluid 101 circulating through the transmission 100. Referring to FIG. 7, the heat exchanger 90 includes a second heat exchanger 102 disposed within the outlet chamber 54 of the condenser 34, and is in fluid communication with the transmission 100. The transmission fluid 101 circulates through the second heat exchanger 102 to transfer heat from the transmission fluid 101 to the liquid coolant 25. It should be understood that a plurality of heat exchanger 90, 102 may be disposed within the condenser 34, for removing heat from a plurality of different fluids, each fluid flowing through one of the plurality of heat exchangers 90, 102. The plurality of different fluids may include a steering fluid, a fuel, an exhaust gas, or some other fluid necessary for the efficient operation of the vehicle.

The foregoing invention has been described in accordance with the relevant legal standards; thus, the description is exemplary rather than limiting in nature. Variations and modifications to the disclosed embodiments may become apparent to those skilled in the art and do come within the scope of the invention. Accordingly, the scope of legal protection afforded this invention can only be determined by studying the following claims.

What is claimed is:

1. The thermal management system for a vehicle, said system comprising:

a Heating Ventilating Air Conditioning (HVAC) unit including a radiator for removing heat from a liquid coolant and further including a condenser circulating a refrigerant therethrough and in fluid communication with said radiator for circulating the liquid coolant through said condenser to remove heat from the refrigerant;

an engine having a pump in fluid communication with said radiator for circulating the liquid coolant through said radiator;

said condenser comprising:

a plurality of plates including a plurality of first plates and a plurality of second plates stacked in alternating relationship relative to said plurality of first plates with each of said plurality of second plates sandwiched between a pair of said plurality of first plates;

said plurality of plates each including a first end defining an inlet chamber for receiving the liquid coolant and further including a second end defining an outlet chamber for discharging the liquid coolant;

said plurality of plates each defining at least one inlet passage disposed adjacent said inlet chamber near said first end of said plurality of plates for receiving the refrigerant and each of said plurality of plates further defining at least one outlet passage disposed adjacent said outlet chamber near said second end of said plurality of plates for discharging the refrigerant;

said plurality of plates cooperating together to define a refrigerant path in fluid communication with said at least one inlet passage and said at least on outlet passage for circulating the refrigerant therethrough and further defining a coolant path separate from said refrigerant path and in fluid communication with said inlet chamber and said outlet chamber for circulating the liquid coolant therethrough; and a heat exchanger disposed within said outlet chamber of said condenser and in fluid communication with said engine for circulating an engine oil from said engine through said heat exchanger to transfer heat from the engine oil to the liquid coolant as the liquid coolant circulates through said outlet chamber.

2. The system as set forth in claim 1 wherein said heat exchanger includes a plurality of cooler plates each defining a channel therethrough and stacked in spaced relationship for permitting the liquid coolant to circulate between said plurality of cooler plates in said outlet chamber.

3. The system as set forth in claim 2 wherein said heat exchanger includes an intake in fluid communication with said channels of said plurality of cooler plates for directing the engine oil from said engine into said channels and further including an outtake in fluid communication with said channels of said plurality of cooler plates for discharging the engine oil from said channels of said plurality of cooler plates back to said engine.

4. The system as set forth in claim 3 further comprising a transmission coupled to said engine and circulating a transmission fluid through said transmission and said heat exchanger includes a second heat exchanger in fluid communication with said transmission for circulating the transmission fluid through said second heat exchanger to transfer heat from the transmission fluid to the liquid coolant.

5. The system as set forth in claim 1 wherein each of said plurality of plates includes an outer wall extending upward a pre-determined distance with said outer wall of each of said plurality of plates in sealing engagement with said outer wall of any other of said plurality of plates abutting said outer wall of each of said plurality of plates.

6. The system as set forth in claim 5 wherein each of said plurality of first plates include a first ring disposed circumferentially around said at least one inlet passage and a second ring disposed circumferentially around said at least one outlet passage with said first ring and said second ring extending upward said pre-determined distance from said plurality of first plates to abut in sealing engagement one of said plurality of second plates disposed directly above each of said plurality of first plates.

7. The system as set forth in claim 6 wherein said plurality of second plates include a first wall and a second wall extending across a width of said plurality of second plates and extending upward said pre-determined distance from said plurality of second plates to abut in sealing engagement one of said plurality of first plates disposed directly above each of said plurality of second plates, with said first wall disposed between said inlet chamber and said at least one inlet passage and said second wall disposed between said outlet chamber and said at least one outlet passage.

8. The system as set forth in claim 7 wherein each of said plurality of plates include a plurality of flow disrupting devices extending upward from said plurality of plates for creating turbulence in the liquid coolant and the refrigerant to increase a heat transfer coefficient between the liquid coolant and the plurality of plates and between the refrigerant and the plurality of plates.

9. The system as set forth in claim 8 wherein said plurality of flow disrupting devices extend upward said pre-determined distance from said plurality of plates to abut in sealing engagement one of said plurality of plates disposed directly above each of said plurality of plates.

10. The system as set forth in claim 8 wherein said condenser further comprises a top cover disposed above said plurality of plates in sealing engagement with said outer wall of one of said plurality of plates disposed below and abutting said top cover.

11. The system as set forth in claim 10 wherein said top cover includes a refrigerant inflow port in fluid communication with said at least one inlet passage and a refrigerant outflow port in fluid communication with said at least one outlet passage and further including a coolant inflow port in fluid communication with said inlet chamber and a coolant outflow port in fluid communication with said outlet chamber.

12. The system as set forth in claim 11 wherein said condenser further comprises a bottom cover disposed below said plurality of plates in sealing engagement with said outer wall of one of said plurality of plates disposed above and abutting said bottom cover for sandwiching said plurality of plates between said top cover and said bottom cover.

13. The system as set forth in claim 12 wherein said at least one inlet passage includes a plurality of inlet passages and said at least one outlet passage includes a plurality of outlet passages.

14. The system as set forth in claim 1 wherein said radiator includes a low temperature radiator having a primary cooling passageway for removing a first quantity of heat and further includes a secondary cooling passageway for removing an second quantity of heat in addition to the first quantity of heat removed by said primary cooling passageway.

15. The system as set forth in claim 14 wherein said radiator is formed from aluminum.

16. A condenser for transferring heat from a refrigerant to a liquid coolant, said condenser comprising:
    a plurality of plates including a plurality of first plates and a plurality of second plates stacked in alternating relationship relative to said plurality of first plates with each of said plurality of second plates sandwiched between a pair of said plurality of first plates;
    said plurality of plates each including a first end defining an inlet chamber for receiving the liquid coolant and further including a second end defining an outlet chamber for discharging the liquid coolant;
    said plurality of plates each defining at least one inlet passage disposed adjacent said inlet chamber near said first end of said plurality of plates for receiving the refrigerant and each of said plurality of plates further defining at least one outlet passage disposed adjacent said outlet chamber near said second end of said plurality of plates for discharging the refrigerant;
    said plurality of plates cooperating together to define a refrigerant path in fluid communication with said at least one inlet passage and said at least on outlet passage for circulating the refrigerant therethrough and further defining a coolant path separate from said refrigerant path and in fluid communication with said inlet chamber and said outlet chamber for circulating the liquid coolant therethrough; and
    a heat exchanger disposed within said outlet chamber for circulating a fluid through said heat exchanger to transfer heat from the fluid to the liquid coolant as the liquid coolant circulates through said outlet chamber.

17. The condenser as set forth in claim 16 wherein said heat exchanger includes a plurality of cooler plates each defining a channel therethrough and stacked in spaced relationship for permitting the liquid coolant to circulate between said plurality of cooler plates in said outlet chamber.

18. The condenser as set forth in claim 17 wherein said heat exchanger includes an intake in fluid communication with said channels of said plurality of cooler plates for directing the fluid into said channels and further including an outtake in fluid communication with said channels of said plurality of cooler plates for discharging the fluid from said channels of said plurality of cooler plates.

19. The condenser as set forth in claim 18 wherein said heat exchanger includes a plurality of heat exchangers disposed within said outlet chamber and said fluid includes a plurality of different fluids for transferring heat from the plurality of different fluids to the liquid coolant.

20. The condenser as set forth in claim 16 wherein each of said plurality of plates includes an outer wall extending upward a pre-determined distance with said outer wall of each of said plurality of plates in sealing engagement with said outer wall of any other of said plurality of plates abutting said outer wall of each of said plurality of plates.

21. The condenser as set forth in claim 20 wherein each of said plurality of first plates include a first ring disposed circumferentially around said at least one inlet passage and a second ring disposed circumferentially around said at least one outlet passage with said first ring and said second ring extending upward said pre-determined distance form said plurality of first plates to abut in sealing engagement one of said plurality of second plates disposed directly above each of said plurality of first plates.

22. The condenser as set forth in claim 21 wherein said plurality of second plates include a first wall and a second wall extending across a width of said plurality of second plates and extending upward said pre-determined distance from said plurality of second plates to abut in sealing engagement one of said plurality of first plates disposed directly above each of said plurality of second plates, with said first wall disposed between said inlet chamber and said at least one inlet passage and said second wall disposed between said outlet chamber and said at least one outlet passage.

23. The condenser as set forth in claim 22 wherein each of said plurality of plates include a plurality of flow disrupting devices extending upward from said plurality of plates for creating turbulence in the liquid coolant and the fluid to increase a heat transfer coefficient between the liquid coolant and the plurality of plates and between the fluid and the plurality of plates.

24. The condenser as set forth in claim 23 further comprising a top cover disposed above said plurality of plates in sealing engagement with said outer wall of one of said plurality of plates disposed below and abutting said top cover.

25. The condenser as set forth in claim 24 wherein said top cover includes a refrigerant inflow port in fluid communication with said at least one inlet passage and a refrigerant outflow port in fluid communication with said at least one outlet passage and further including a coolant inflow port in fluid communication with said inlet chamber and a coolant outflow port in fluid communication with said outlet chamber.

26. The condenser as set forth in claim 25 further comprising a bottom cover disposed below said plurality of plates in sealing engagement with said outer wall of one of said plurality of plates disposed above and abutting said bottom cover for sandwiching said plurality of plates between said top cover and said bottom cover.

27. The condenser as set forth in claim 26 wherein said at least one inlet passage includes a plurality of inlet passages and said at least one outlet passage includes a plurality of outlet passages.

28. The condenser as set forth in claim 27 wherein said plurality of inlet passages is equal to four inlet passages and said plurality of outlet passages is equal to four outlet passages.

* * * * *